(12) United States Patent
Rousseau et al.

(10) Patent No.: US 7,106,717 B2
(45) Date of Patent: Sep. 12, 2006

(54) APPARATUS, AND ASSOCIATED METHOD, FOR FACILITATING LOCATION DETERMINATION OF A MOBILE STATION PURSUANT TO A LOCATION BASED APPLICATION

(75) Inventors: Jean-Michel Rousseau, San Diego, CA (US); Hemant Chaskar, Woburn, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/923,497

(22) Filed: Aug. 20, 2004

(65) Prior Publication Data
US 2005/0078652 A1    Apr. 14, 2005

Related U.S. Application Data

(60) Provisional application No. 60/497,085, filed on Aug. 22, 2003.

(51) Int. Cl.
*H04Q 7/24*  (2006.01)
*H04Q 7/00*  (2006.01)

(52) U.S. Cl. .............. 370/338; 370/328; 370/395.21; 455/456.1

(58) Field of Classification Search .............. 370/328, 370/338, 270, 395.21; 455/456.1; 379/340
See application file for complete search history.

(56) References Cited

U.S. PATENT DOCUMENTS

| | | | |
|---|---|---|---|
| 6,697,628 B1 * | 2/2004 | Green et al. ........... | 342/357.01 |
| 2004/0008660 A1 * | 1/2004 | Lee ............................ | 370/349 |
| 2004/0203900 A1 * | 10/2004 | Cedervall et al. ......... | 455/456.1 |
| 2005/0043038 A1 * | 2/2005 | Maanoja et al. ......... | 455/456.1 |

* cited by examiner

Primary Examiner—Afsar Qureshi
(74) Attorney, Agent, or Firm—Alston & Bird LLP (57) ABSTRACT

Apparatus, and an associated method, for facilitating implementation of a location service in a radio communication system. When a location service is initiated, a network-based entity is alerted to the service initiation. The network-based entity generates a message to inquire of network-based information that facilitates the location determination of the mobile station pursuant to the location service. When the information is obtained, the information is forwarded to the mobile station. The information is used at the mobile station to facilitate the effectuation of the location service.

20 Claims, 4 Drawing Sheets

APPARATUS, AND ASSOCIATED METHOD, FOR FACILITATING LOCATION DETERMINATION OF A MOBILE STATION PURSUANT TO A LOCATION BASED APPLICATION

CROSS REFERENCE TO RELATED APPLICATIONS

The present invention claims the priority of provisional patent application 60/497,085, file on Aug. 22, 2003, the contents of which are incorporated herein.

The present invention relates generally to the implementation of a location service in a radio communication system, such as a CDMA 2000, cellular communication system. More particularly, the present invention relates to an apparatus, and an associated method, for obtaining information at a network part of the radio communication system by which to assist in the effectuation of a location-based application. Assisted-GPS (Global Positioning System) data and calculations, and other assistance, is provided to a mobile station to assist in the implementation of the location based application.

The information is obtained using IP-based (Internet Protocol-based) messaging at the network part, and the information is provided to the mobile station irrespective of whether the mobile station is in its home network or is roaming in a visited network.

BACKGROUND OF THE INVENTION

Ready access by a user to a communication system through which to communicate is a practical necessity of modern society. During operation of a communication system, data is communicated between a set of communication stations. At least one of the communication stations of the set forms a sending station, and at least another of the communication stations of the set forms a receiving station. The sending and receiving stations are interconnected by way of a communication channel.

During operation of the communication system, data is communicated by a sending station to a receiving station upon the communication channel. The receiving station detects delivery of the data, and the receiving station recovers the informational content of the data.

Communication systems of many different types of constructions and capabilities have been developed and deployed. Effectuation of different types of communication services are provided by the different types of communication systems. New types of communication systems that permit the effectuation of new types of communication services have been developed and deployed. The new types of communications systems generally make use of advancements in communication technologies.

A radio communication system is an exemplary type of communication system. In a radio communication system, the communication channel that interconnects sending and receiving stations is formed of a radio channel. A radio channel is defined upon a radio link, i.e., a non-wireline link, extending between the communication stations. Because communications are effectuated upon a channel defined upon a radio link, not upon a wireline, communications stations of a radio communication system need not be positioned at locations at which connections to wirelines are available. Communications are therefore sometimes effectuable in a radio communication system when communications are not correspondingly possible through use of a wireline communication system. Additionally, radio communication systems are implementable as mobile communication systems in which one or more of the communication stations is provided with communication mobility.

A cellular communication system is an exemplary type of radio communication system. Cellular communication systems have achieved high levels of usage, and the networks of cellular communication systems have been installed to encompass significant portions of the populated areas of the world. Successive generations of cellular communication systems have been developed and deployed. So-called, first generation systems generally provided for voice communications and limited data services. Subsequent generations of systems provide for the effectuation of increasingly data intensive communication services. New generations of cellular communication systems utilize packet communications, such as IP (Internet Protocol) communications. A cdma 2000, cellular communication system, operable in general conformity with an operating specification promulgated by the 3GPP2 (Third Generation Partnership Project 2) is exemplary of a new generation, cellular communication system that provides for internet protocol-based communications services.

Amongst the internet protocol services that are, or are intended to be, available are IP-Based Location Services (LCSs). An important component in providing a location-based applications is the geographical positioning of a mobile station. The location service enables the location-based applications to obtain the information about the mobile station. Examples of location-based applications include, for instance, identification of a nearest restaurant, or other facility, to a user of a mobile station, providing a user of the mobile station with directions to a selected destination, providing a user of the mobile station with local weather or other physician-dependent information, providing emergency services, fleet management, etc.

A conventional manner by which to identify the geographical positioning of a mobile station is through use of a global positioning system (GPS). A GPS receiver forms part of a mobile station to provide the mobile station with location information. During its operation, measurements are made on GPS satellite beacons that, in turn, are used to calculate the geographical location of the mobile station and, hence, its user. The measurements and resultant location calculation of the mobile station are performable entirely at the mobile station. However, making the measurements and calculations entirely at the mobile station has some disadvantages. For instance, calculation of the location of the mobile station sometimes is time-consuming, inaccurate if performed at low levels of precision, and not feasible, e.g., if the GPS satellite beacons are not detectable by the mobile station. For instance, in urban areas, building structures might interfere with the ability of the mobile station to detect the GPS satellite beacons.

To compensate for these disadvantages and limitations, assisted GPS (A-GPS) is sometimes used. In assisted GPS, some assistance data is provided by the network to the mobile station. And, as calculation of the location of the mobile station is a computationally complex operation, the network in which the mobile station is operable sometimes also assists the mobile station in the location calculations by using measurements done at the mobile station. An entity that provides assistance to the mobile station for geographical positioning of the mobile station is sometimes referred to as a position determining entity (PDE). Standardized protocols relating to the exchange of information pursuant to A-GPS between the PDE and to the mobile station is set forth in IS-801, promulgated by a standard-setting body.

While existing protocols related to location services have been set forth, such protocols are either predicated upon traditional circuit-switched architectures using SS7 signaling or rely upon awkward methods for protocol communications.

What is needed, therefore, is a straightforward, IP-Based scheme by which to facilitate location services.

It is in light of this background information related to location services in a packet radio communication system that the significant improvements of the present invention have evolved.

SUMMARY OF THE INVENTION

The present invention, accordingly, advantageously provides apparatus, and an associated method, for implementing a locations service in a radio communication system, such as a cdma 2000, cellular communication system.

Through operation of an embodiment of the present invention, a manner is provided for a network part of the radio communication system to obtain information by which to assist in the effectuation of a location based application. Assisted GPS (Global Positioning System) data and calculations, and other assistance, is provided to a mobile station to assist in the implementation of the location service.

IP-based messaging is utilized to obtain the information. The need otherwise to utilize SS7 signaling or cumbersome methods utilizing RADIUS (Remote Authentication Dial- and User Service) protocols are obviated.

In one aspect of the present invention, the location service is initiated by a mobile station. The location service is initiated to identify the location of the mobile station pursuant to a location based application. The location-based application is embodied at the network part of the communication system, or elsewhere, e.g., at the mobile station. Pursuant to the initiation of the location service at the mobile station, the mobile station generates a positioning request that is sent, by way of a radio channel defined upon a radio air interface, to a network-positioned entity. The network-positioned entity is, for example, an entity embodied at a home network associated with a mobile station. The positioning request includes various information, for example, attributes of the location information that is to be provided pursuant to the location service. Additional information, such as the identity of the location based application that is to use the location information is contained in the message as well as authentication data usable to authenticate the mobile station. Additional information contained in the positioning request identifies the location of the mobile station in the communication system, such as by the network identifier, service identifier, and base station identifier at which the mobile station is in communication connectivity with the network part of the communication system.

Upon delivery of the positioning request to the network-positioned entity, the network-positioned entity generates an inquiry to inquire of network-obtainable information that is useable pursuant to the location service. The inquiry inquires of the network-obtainable information, once obtained. Responsive to the inquiry, a reply is provided to the inquiry together with the network-obtainable information. And, in response, the network-positioned entity generates a response that is returned to the mobile station. The response includes values representative of the network-obtainable information obtained in reply to the inquiry. In one implementation, the network-obtainable information is formed of network-stored information. In another implementation, the network-obtainable information is computed in response to the inquiry. More generally, the inquiry is made to identify the location of the mobile station.

The inquiry is a packet-formatted inquiry, i.e., an IP-formatted message, and the response message sent by the network-positioned entity for delivery to the mobile station also is a packet-formatted message. The information contained in the discovery response facilitates the location service effectuation at the mobile station or, alternately, facilitates the mobile station in obtaining additional assistance to effectuate the location service. Thereafter, the location service provides location information to permit effectuation of the location based application.

Initiation of the location service is also possible from the network. That is to say, a network-initiated location service is also provided. When the location service is initiated at the network, a network-generated location request is sent to the network-positioned entity associated with the mobile station. The network-initiated request also includes a request first made by a mobile station other than the mobile station whose location is to be obtained pursuant to the location service.

Upon delivery of the request to the network-positioned entity, the network-positioned entity generates an inquiry message forming an inquiry to inquire of network-obtainable information available to facilitate location determination of the mobile station. The network-obtainable information is accessed, or otherwise calculated, and returned to the network-positioned entity as a reply to the inquiry. And, the network-positioned entity generates a response that is sent to the mobile station. The response includes values that are representative of the information obtained in response to the inquiry. And, the mobile station utilizes the information pursuant to the location service. Once the location information of the mobile station is determined, the location information is provided to the location based application.

The mobile station is positionable in either its home network or in a visited network. That is to say, the mobile station is positionable both within the coverage area of its home network as well as within the coverage area of a visited network. The initiation of the location service, wherever initiated, is commenced with a request that is routed to the home network associated with the mobile station. If the request is initiated at the network part of the communications system, the initiation request is routed through the network and delivered to the network-positioned entity located in the home network of the mobile station. If the initiation commences with a mobile-station generated request, the request is sent on a radio channel, delivered to a radio access network, routed through the radio access network to the network-positioned entity located in the home network associated with the mobile station. The location service is effectuable irrespective of whether the mobile station is positioned in its home network or positioned at a visited network.

The network assistance to the effectuation of the location service is carried out using IP-formatted messages that are efficiently and straightforwardly communicated in the radio network. When the radio network provides for packet communications, such as a CDMA 2000 cellular communication system, messaging generated during operation of an embodiment of the present invention provides for identification, calculation, and delivery of information to assist a mobile station to effectuate its location service. And, performance of a location based application is carried out by the radio communication system using the location of the mobile station obtained pursuant to the location service.

In these and other aspects, therefore, apparatus, and an associated method, is provided for a packet radio communication network for facilitating location determination of a mobile station pursuant to a location-based service. A network-positioned entity is selectably operable to generate a packet-formatted inquiry to inquire of network-obtainable information available to facilitate the location determination of the mobile station.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
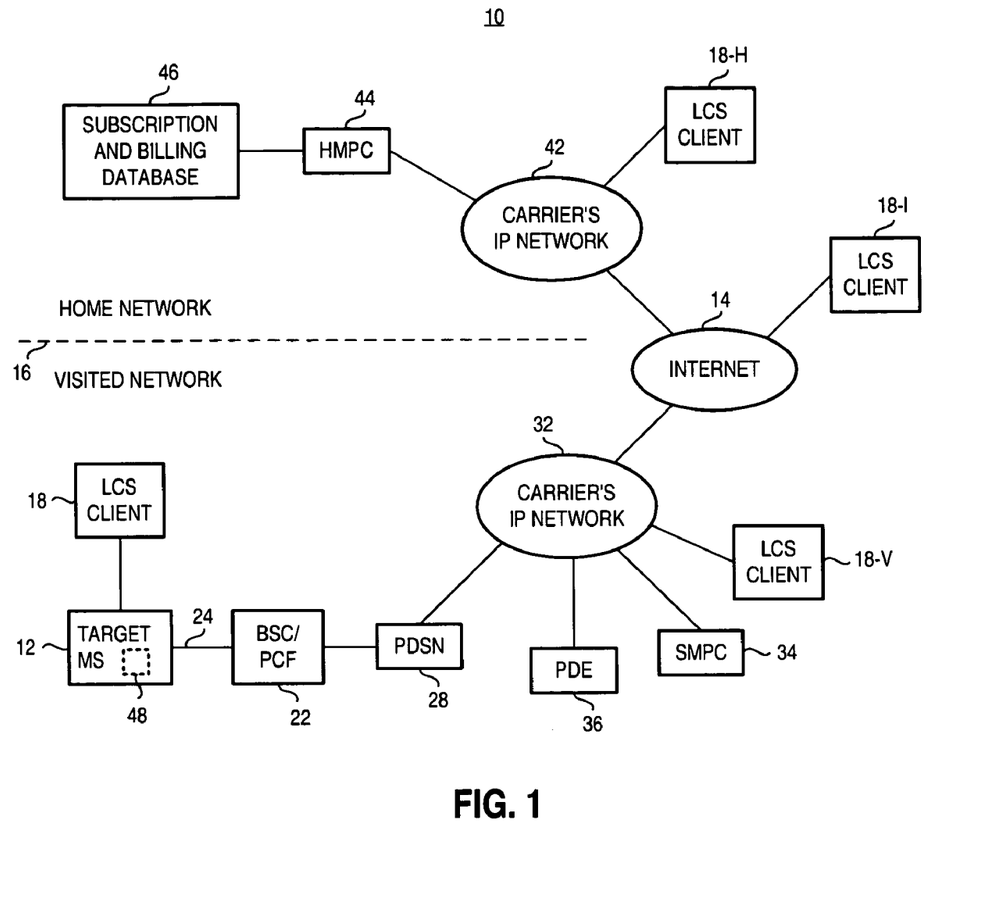
FIG. 1 illustrates a functional block diagram of an exemplary packet radio communication system in which an embodiment of the present invention is operable.

Referring first to FIG. 1, a packet radio communication system, shown generally at 10, provides packet radio communication services with mobile stations, of which the target mobile station (target MS) 12 is representative. In the exemplary implementation, the communication system includes radio network parts that are operable in general conformity with the CDMA2000 operating specification. While the following description shall describe the exemplary implementation of the communication system as a CDMA2000 cellular communication system, the teachings of the present invention are analogously also applicable to packet radio communication systems that are implemented in other manners. Accordingly, while description of exemplary operation of the communication system 10, and an embodiment of the present invention operable therein, is made in terms of its exemplary implementation in the CDMA2000 cellular communication system, such description is exemplary only.

The communication system includes a home network part and a visited network part connected together by way of a packet data network, here the Internet 14. The elements of the packet architecture of the communication system are shown. Other elements of the communication system, for reasons of simplicity, are not shown. Elements positioned above a segment 16 are embodied in the home network part of the communication system, and elements positioned beneath the segment 16 form elements of the visited network part of the communication system.

The target mobile station 12 is permitted mobility to be positioned at any of various locations, including locations encompassed by the home and visited network parts of the communication system. In the positioning shown in the figure, the mobile station is positioned at the visited network and is in communication connectivity therewith. That is to say, the mobile station is here positioned at a location permitting its communication with the visited network part of the communication system.

A location service client (LCS client) 18 is installed at the mobile station and is operable thereat. The LCS client forms an application, or other entity, that initiates location services and receives geographical location information associated with the target mobile station. Location service clients 18-V, 18-H, and 18-I are also shown in the figure. These additional location service clients are representative of location service clients positioned at various parts of the network part of the communication system. The location service clients 18-V, 18-H, and 18-I are each representative of entities capable of initiating a location service and of receiving geographical location information of a target mobile station, such as the mobile station 12. While exemplary operation shall be described with respect to initiation of the location service by the location service client 18 embodied at the mobile station 12, the location service is analogously also implementable by the clients 18-V, 18-H, and 18-I.

The visited network includes a base station controller/packet control function (BSC/PCF) 22 to which the mobile station 12 is coupled by way of the line 24. The line 24 is representative both of radio channels defined upon a radio air interface and network connections that extend to the BSC/PCF 22. The base station controller/packet control function operates, amongst other things, to control communication operations in the network.

The base station controller/packet control function is, in turn, coupled to a packet data support node (PDSN) 28. The packet data support node is coupled to the IP (Internet protocol) network 32 of the carrier that operates the visited network. And, the network 32, in turn, is coupled to the Internet 14.

The visited network part of the communication system also includes network-positioned entities 34 and 36. The entity 34 here is referred to as a serving mobile positioning center (SMPC). And, the entity 36 here is referred to as a position determining entity (PDE). The mobile positioning center forms an entity that serves as an interface between a location service client, such as the location service client 18, and the location service. The location service is a framework offered in a CDMA network to initiate, calculate, and deliver geographical location information of a target mobile station. The mobile positioning center accepts requests for position determination of the target mobile station from location service clients, forms authentication, authorization, and accounting (AAA) functions as well as controls the discovery and assignment of resources such as the position determining entity for an assisted GPS positioning session.

The home network part of the communication system also includes an IP network of the carrier that operates the home network. The IP network is here designated at 42. A network-positioned entity, here referred to as a home mobile positioning center (HMPC) 44 is coupled to the network 42. And, databases, here subscription and billing databases 46, are coupled to the entity 44.

Pursuant to operation of an embodiment of the present invention, a manner is provided by which to facilitate performance of a location service pursuant to a location-based application. When the location service is initiated, IP-based signaling is generated, as shall be described hereinbelow, to obtain information to assist the mobile station in determination of its location. The mobile station 12 here includes a GPS (global positioning system) receiver 48 that performs GPS-related operations, here with the assistance of the network, to obtain the location of the mobile station.

Figure 2:
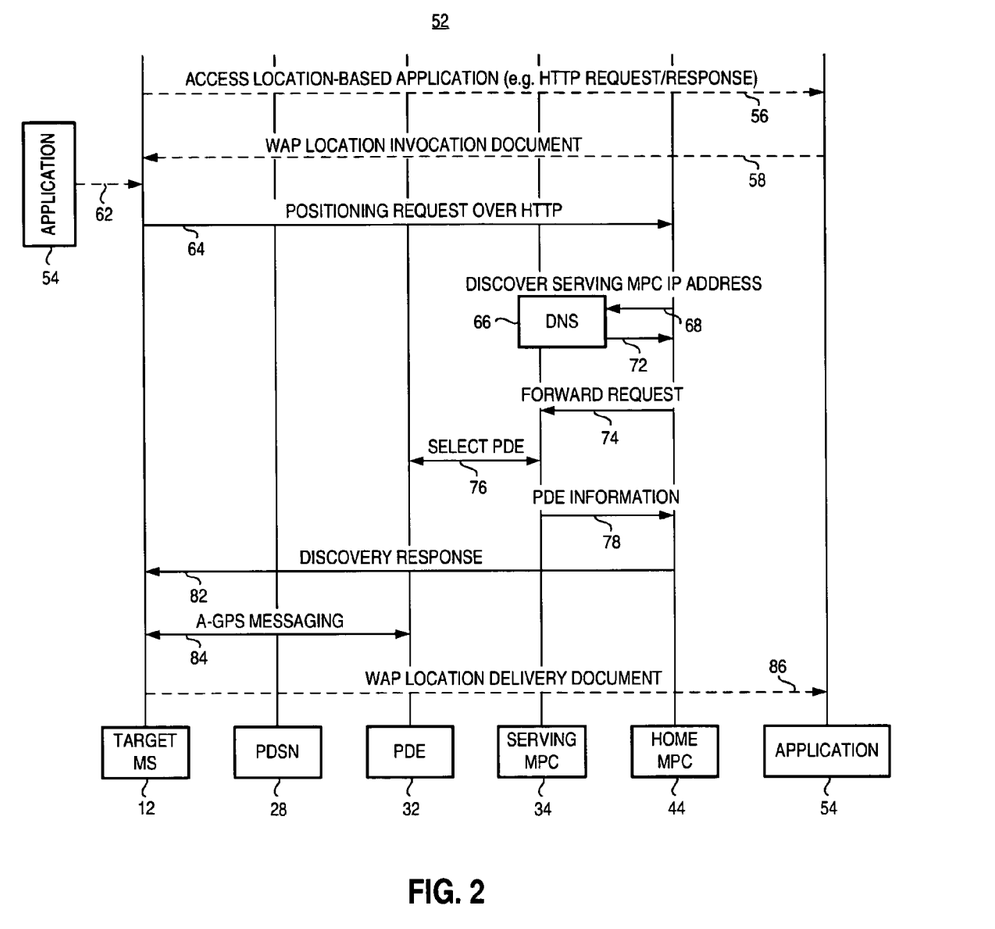
FIG. 2 illustrates a message sequence diagram showing exemplary signaling generated during operation of the packet radio communication system shown in FIG. 1 pursuant to operation of an embodiment of the present invention.

Turning next to FIG. 2, a message sequence diagram, shown generally at 52, represents the signaling generated in a mobile station-initiated location service. That is to say, with respect to the elements shown in the communication system 10 of FIG. 1, the signaling shown in the diagram includes signaling variously between the target mobile station 12, the packet data support node 28, the position determining entity 32, the serving mobile positioning center 34, the home mobile positioning center 44, and the location-based application, e.g., embodied at a network location, and here represented by element 54.

First, and as indicated by the segment 56, a location-based application is accessed by the target mobile station. The access is here made, e.g., by an HTTP request/response procedure. Then, and as indicated by the segment 58, the location service client in the target mobile station is activated. In the exemplary implementation shown in the figure, the target mobile station first initiates a data call by way of the CDMA network in conventional manner. The mobile station then accesses a service on a web server, e.g., through access of a web page, clicking on a designated link, or submitting a form. The web server to which the access is made detects the need for the location information of the target mobile station to offer the appropriate service. The web server sends a message, here a WAP location in location document to the target mobile station. The document is, e.g., an XML formatted location request. The request indicates the need for the location information and, additionally, a description of the attributes of the location information, such as position quality of service (PQoS), a transaction rate, defined in terms, e.g., a frequency of location reporting, as well as other appropriate attributes. The sequence diagram also shows an alternate, exemplary implementation, here in which the application 54' is embodied at the mobile station. Here, the two-way segment 62 is representative of alternate signaling, analogous to the signals 56 and 58.

The mobile station then generates a positioning request, indicated by the segment 64, that is communicated to the network, and routed therethrough, for delivery to the network-positioned entity 44. The positioning request includes information, such as, the attributes of the location information, e.g., the attributes previously provided to the mobile station in the message 58. The request also includes, e.g., the identity of the location-based application 54, that is to use the location information, authentication data to be used to assert the identity of the target mobile station to the network-positioned entity, the network identifier (NID), service identifier (SID), and base station identifier (BSID) identifying where the mobile station is in the communication connectivity with the network part of the communication system.

In the exemplary implementation, the request 64 is formed of an HTTP (hypertext transfer protocol) message. In other implementations, the message is formed in other manners. Use of an HTTP message is advantageous for the reason that an HTTP message includes built-in request/response semantics as well as support for mutual authentication and encryption. While the message is shown as a single segment, when the functions performed by the message are HTTP-implemented, a number of messages are communicated. For example, the home mobile positioning center 44 forming the network-positioned entity is able to challenge the target mobile station for authentication and to provide a nonce, e.g., a random number. The target mobile station, in response, performs cryptographic algorithms, e.g., message digest 5-MD5, to compute a signature. The nonce and shared secret, e.g., a password, between the mobile station and the entity 44 is used in addition to the other information to compute the signature. The target mobile station sends the signature to the entity 44. And, the entity 44 also runs similar cryptographic algorithms locally, using the nonce, shared secret, and other information to compute the signature and verifies that the signature provided by the mobile station matches the one computed locally by the network-positioned entity. The home mobile position center 44 determines the identity of the serving mobile positioning center. Pursuant to this, the entity 44 formulates, e.g., a fully qualified domain name (FQDN) that is indicative of the NID and SID information. An example of such a domain name is NID.SID.MPC.NET. The home mobile positioning center then queries a domain name server (DNS) 66. The query is indicated by the segment 68, and the response is indicated by the segment 72.

Then, and as indicated by the segments 74, the network-based entity 44 forwards the positioning request to the serving mobile positioning center. The forwarded request contains parameters such as the identity of the target mobile station 12, the PQoS, the transaction rate, positioning capabilities of the mobile station, the billing ID, the BSID, and other appropriate parameters and information. In one implementation, the request 74 is sent over HTTP/TCP/IP. And, the entities 44 and 34, in one implementation, have a security association that is used to protect the messaging therebetween. That is to say, using HTTP signaling and discovery of the serving MPC by the home MPC, using the SID and NID information passed on by the mobile station is provided.

Then, and as indicated by the segment 76, the entity 34 selects a position determining entity that shall assist the mobile station in assisted GPS positioning. Here, the entity 32 is selected. And, as indicated by the segment 78, the entity 34 sends the information related to the entity 32 to the entity 44. Again, in one implementation, the information is sent over HTTP/TCP/IP. The information includes, for instance, the IP address of the position determining entity, a transport protocol used for communicating with the entity, e.g., TCP or UDP, and an associated port number, a lifetime, i.e., time period, for which the entity 32 shall be assigned, and a security key. The security key is, for instance, used to protect, i.e., authenticate/encrypt, communication between the mobile station and the entity 32.

Thereafter, and as indicated by the segment 82, the network-positioned entity 44 sends the received information on to the mobile station.

The mobile station initiates an assisted-GPS session with the assigned network entity 32. Communications are effectuated using the prescribed transport protocol and port number in order to exchange messages required for geographical positioning. Then, and as indicated by the segment 86, the mobile station transports the geographical location information that is calculated to the application 54. The information is communicated, for instance, by the sending of a WAP location delivery document to the web server. If, as in the alternate implementation, the application is local to the target mobile station, i.e., the application 54', the location information is transferred to the application locally.

In various implementations, alterations to the various of the signals and messages generated during operation of the communication system 10, and represented by the message sequence diagram 52, are made. For instance, the functionality of the messages 68 and 72 are carried out, but in a different manner. In one implementation, for instance, prior to sending the positioning request 64, the target mobile station 12 performs the query to the domain name server 66 in a visited network and obtains the IP address of the network-based entity 34 responsive to the inquiry. The fully qualified domain name that is used in the domain name server query is again constructed, indicative of, e.g., the NID values that identify the part of the network in which the mobile station is in the communication connectivity. And, once the IP address of the entity 34 is obtained, the address is included in the positioning request. And, operation continues with the generation of the request 74.

In another exemplary alternative implementation, the fully qualified domain name used pursuant to the domain name server query utilizes parameters other than the NID and SID. For instance, in substitution for these parameters, a substitute name is utilized. For example, the fully qualified domain name, in one implementation, is formed of the name of an operator that operates the visited network in which the mobile station is located.

Figure 3:
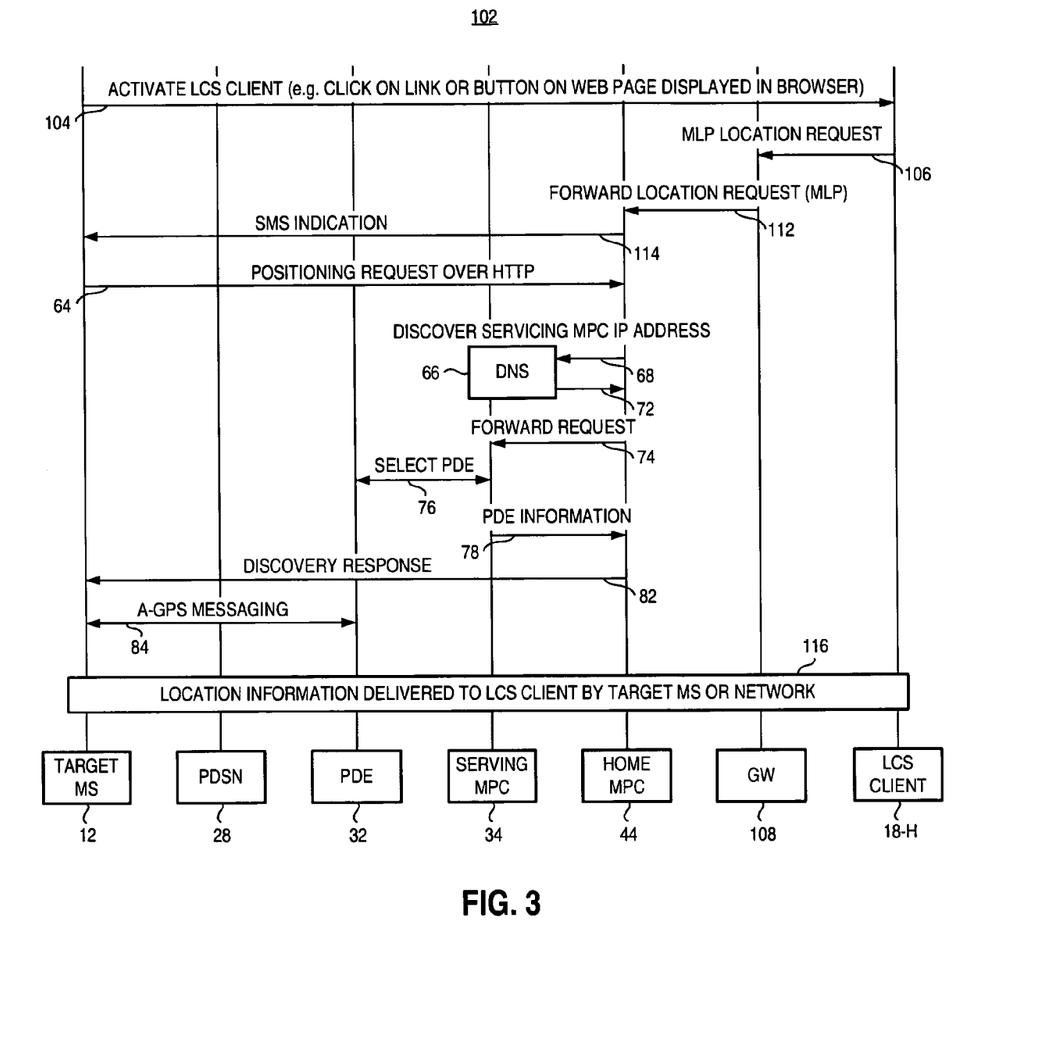
FIG. 3 illustrates another message signal diagram, also representative of exemplary operation of the packet radio communication system shown in FIG. 1 pursuant to operation of an embodiment of the present invention.

FIG. 3 illustrates a message sequence diagram, shown generally at 102, also representative of signaling generated during operation of the radio communication system shown in FIG. 1. Here, the location service is initiated at the network part of the communication system. Again, the exemplary implementation illustrates a scenario in which the mobile station is roaming in a visited network, as shown in the illustration of FIG. 1.

First, and as indicated by the segment 104, the location service client embodied at a network entity is activated. In the exemplary operation shown in the diagram 102, the target mobile station 12 initiates a data call by way of the CDMA network formed of the network of the radio communication system in conventional manner. The mobile station then accesses the service on a web server, e.g., by accessing a web page, clicking on a link, or submitting a form that, in turn, activates the location service client, here the client 18-H, on the web server. In an alternate embodiment, the location service client is activated from an entity located at the network part of the communication system. An example of a scenario in which the location service client is activated from the network entity is a fleet manager that issues a query to the location service client to locate a specific target mobile station.

Then, and as indicated by the segment 106, the location service client generates a request for location information associated with the target mobile station. The request is forwarded to a gateway 108. An exemplary candidate interface for a location service client-gateway communication is an MLP. An MLP is implementable, e.g., over HTTP/TCP/IP. The gateway, in turn, routes the request, indicated by the segment 112, to the network-positioned entity 44.

And, in turn, the network-positioned entity 44, here the home mobile positioning center, sends an indication, indicated by the segment 114 to the target mobile station to alert the mobile station of the need for geographical positioning. In the exemplary implementation, the indication is sent using an SMS (short message service) message. The indication contains a reference identification and the identity of the location service client 18-H. The indication also, for instance, contains attributes of desired location information, such as the PQoS, transaction rate, or other attribute indications. Upon receipt of the indication, the target mobile station selectably prompts a user of the mobile station for consent to provide the location information to the location service client. Subsequent messaging proceeds if the user provides consent. Otherwise, a negative acknowledgement, NACK, is sent to the network-positioned entity 44, and the procedure is aborted.

Then, messages 64, 68, 72, 74, 76, 78, 82, and 84 are generated, all as described with respect to the message sequence diagram shown in FIG. 2. Details associated with the generation of such signals are already-described. Reference to the earlier descriptions sets forth the signaling parameters and operations responsive to such signaling. Again, optimization of the mobile station authentication by the home MPC using HTTP signaling and discovery of the serving MPC by the home MPC, using SID and NID information passed on from the mobile station is provided.

Then, and as indicated by the block 116, calculated location information is delivered by the mobile station to the location service client. Any of various implementations are available to carry out this operation. In one exemplary implementation, upon completion of the assisted GPS positioning procedures, the position determining entity 32 forwards the calculated location of the mobile station to the network-positioned entity 34. And, the entity 34, in turn, forwards on the information to the entity 44. And, the entity 44 then forwards the information as a response to the MLP request. In an alternate implementation, the mobile station forwards the calculated location to the location service client for consumer application.

Figure 4:
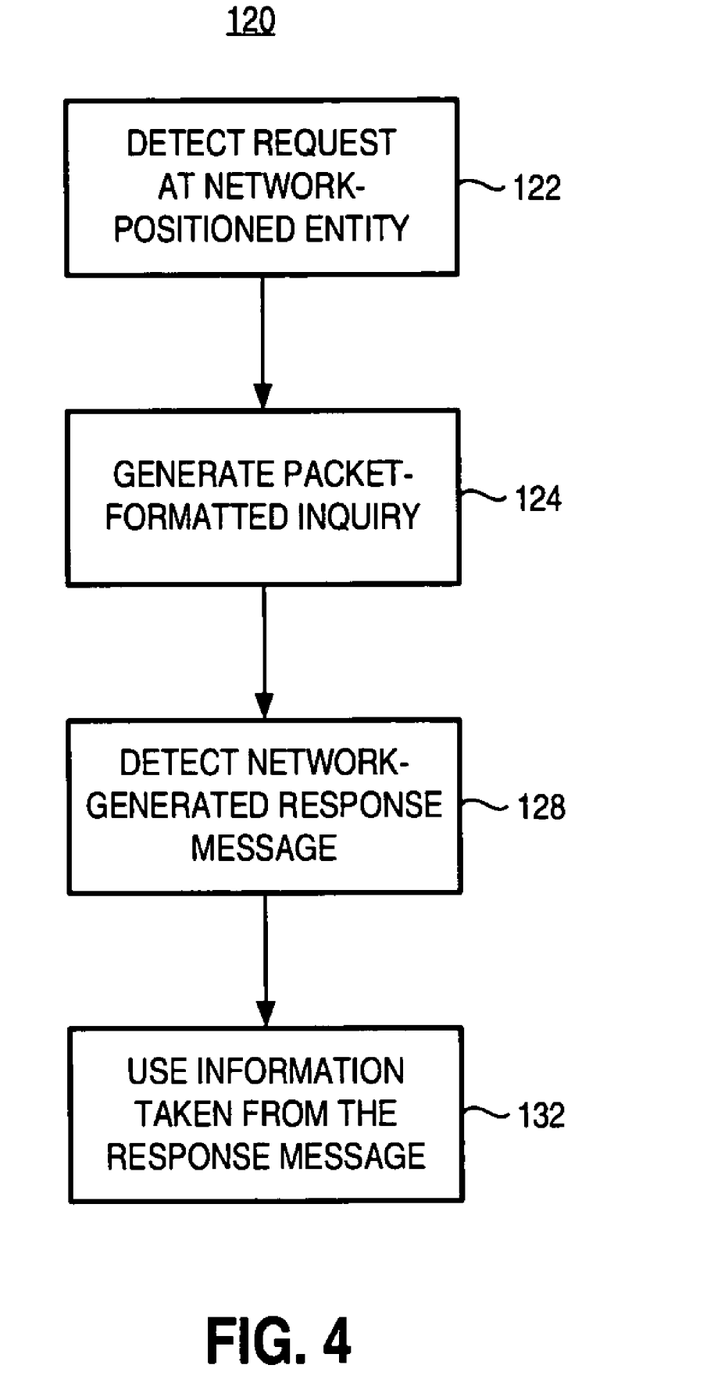
FIG. 4 illustrates a method flow diagram listing the method of operation of an embodiment of the present invention.

FIG. 4 illustrates a method flow diagram, shown generally at 120, representative of the method of operation of an embodiment of the present invention. The method facilitates location determination of a mobile station pursuant to a location-based service.

First, and as indicated by the segment 122, a request is detected at a network-positioned entity to initiate the location-based service.

Then, and as indicated by the block 124, a packet-formatted inquiry is generated to inquire of the network-obtainable information available to facilitate the location determination of the mobile station.

Thereafter, and as indicated by the block 128, detection is made at the mobile station of a network generated response message. The response message includes information obtained in response to the packet-formatted inquiry at the network to inquire of the network-obtainable information available to facilitate the location determination of the mobile station. And, as indicated by the block 132, the information is used to determine the location of the mobile station pursuant to the location-based service.

The previous descriptions are of preferred examples for implementing the invention, and the scope of the invention should not necessarily be limited by this description. The scope of the present invention is defined by the following claims.

What is claimed is:

1. Apparatus for a packet radio communication network for facilitating location determination of a mobile station pursuant to a location based service, said apparatus comprising:

a network-positioned entity selectably operable to generate a packet-formatted inquiry responsive to a positioning request to inquire of network-obtainable information available to facilitate the location determination of the mobile station, the positioning request including a description of an attribute of requested information, requested to be obtained responsive to the positioning request, the positioning request further including information identifying a network location of the mobile station.

2. The apparatus of claim 1 wherein said network-positioned entity is further selectably operable to generate a response message for delivery to the mobile station, the response message including information obtained responsive to generation of the packet-formatted inquiry.

3. The apparatus of claim 1 wherein the network-positioned entity operates to generate the packet-formatted inquiry responsive to mobile station generation of the positioning request that initiates the location-based service.

4. The apparatus of claim 1 wherein the network-positioned entity operates to generate the packet-formatted inquiry responsive to network generation of the positioning request that initiates the location-based service.

5. The apparatus of claim 1 wherein the radio communication network comprises a home network associated with the mobile station and wherein said network-positioned entity is embodied at the home network.

6. The apparatus of claim 5 wherein the radio communication network further comprises a visited network and wherein the mobile station is positioned in communication connectivity with the visited network when said network-positioned entity generates the packet-formatted inquiry.

7. The apparatus of claim 1 wherein the network-obtainable information is obtained at a position determining entity and wherein the packet-formatted inquiry generated by said network-positioned entity inquires of the position determining entity of the network-obtainable information.

8. The apparatus of claim 1 wherein the packet-formatted inquiry comprises a network identifier with which the mobile station is associated.

9. The apparatus of claim 1 wherein the packet-formatted inquiry generated by said network-positioned entity comprises a system identifier with which the mobile station is associated.

10. The apparatus of claim 1 wherein said network-positioned entity is further selectably operable to detect a response to the packet-formatted inquiry.

11. A method for facilitating location determination of a mobile station pursuant to a location based service, said method comprising the operations of:
    detecting, at a network-positioned entity, a positioning request to initiate the location-based service, the positioning request including a description of an attribute of requested information, requested to be obtained responsive to the positioning request, the positioning request further including information identifying a network location of the mobile station; and
    generating, responsive to detection during said operation of detecting, a packet-formatted inquiry to inquire of network-obtainable information available to facilitate the location determination of the mobile station.

12. The method of claim 11 further comprising the operation of sending the packet-formatted inquiry to a network location at which the network-obtainable information is available.

13. The method of claim 12 further comprising the operation, at the network-positioned entity, of detecting a reply to the packet-formatted inquiry.

14. The method of claim 13 further comprising the operation of generating, at the network-positioned entity, a response message for delivery to the mobile station, the response message including information contained in the reply detected during said operation of detecting.

15. The method of claim 11 wherein the positioning request detected during said operation of detecting is made by the mobile station.

16. The method of claim 11 wherein the positioning request detected during said operation of detecting is network-generated.

17. The method of claim 11 wherein the packet-formatted inquiry generated during said operation of generating comprises a network identifier with which the mobile station is associated.

18. The method of claim 11 wherein the packet-formatted inquiry generated during said operation of generating comprises a system identifier with which the mobile station is associated.

19. Apparatus for a mobile station operable in a packet radio communication system having a network, said apparatus for facilitating location determination of the mobile station pursuant to a location-based service, said apparatus comprising.
    a detector embodied at the mobile station, said detector for detecting a network-generated response message delivered to the mobile station, the response message including information obtained in response to a packet-formatted inquiry at the network to inquire of network-obtainable information available to facilitate the location determination of the mobile station, the packet-formatted inquiry generated responsive to a positioning request that includes an attribute of requested information, requested to be obtained responsive to the positioning request, the positioning request further includes information identifying a network location of the mobile.

20. A method for facilitating location determination of a mobile station pursuant to a location-based service, the mobile station operable in a packet radio communication system having a network, said method comprising the operations of:
    detecting a network generated response message delivered to the mobile station, the response message including information obtained in response to a packet-formatted inquiry at the network to inquire of network-obtainable information available to facilitate the location determination of the mobile station, the packet-formatted inquiry generated responsive to a positioning request that includes an attribute of requested information, requested to be obtained responsive to the positioning request the positioning request further includes information identifying a network location of the mobile station; and
    using the information contained in the response message detected during said operation of detecting to determine the location of the mobile station pursuant to the location-based service.

* * * * *

UNITED STATES PATENT AND TRADEMARK OFFICE
CERTIFICATE OF CORRECTION

PATENT NO. : 7,106,717 B2
APPLICATION NO. : 10/923497
DATED : September 12, 2006
INVENTOR(S) : Rousseau et al.

It is certified that error appears in the above-identified patent and that said Letters Patent is hereby corrected as shown below:

Column 12,
Line 36, after "mobile" insert --station--.

Signed and Sealed this

Sixth Day of February, 2007

JON W. DUDAS
*Director of the United States Patent and Trademark Office*